June 11, 1968  SHIGERU SUGANUMA  3,387,581
CARGO SHIPS
Filed Sept. 7, 1966  4 Sheets-Sheet 1
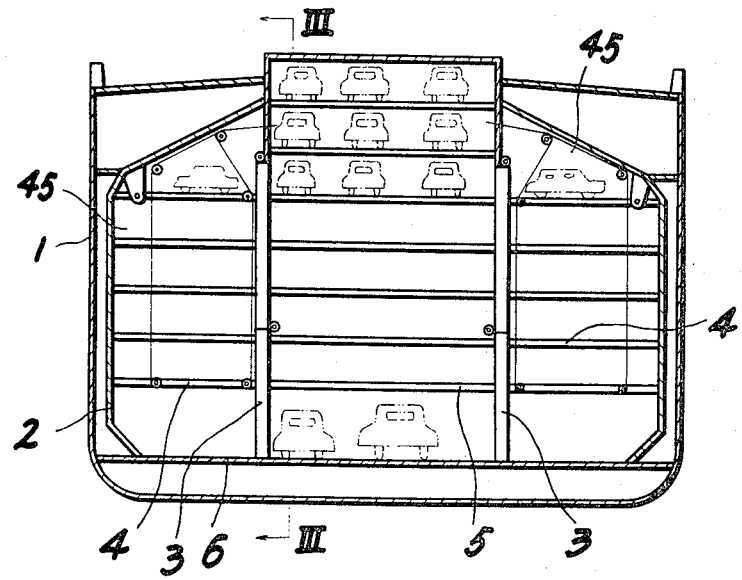
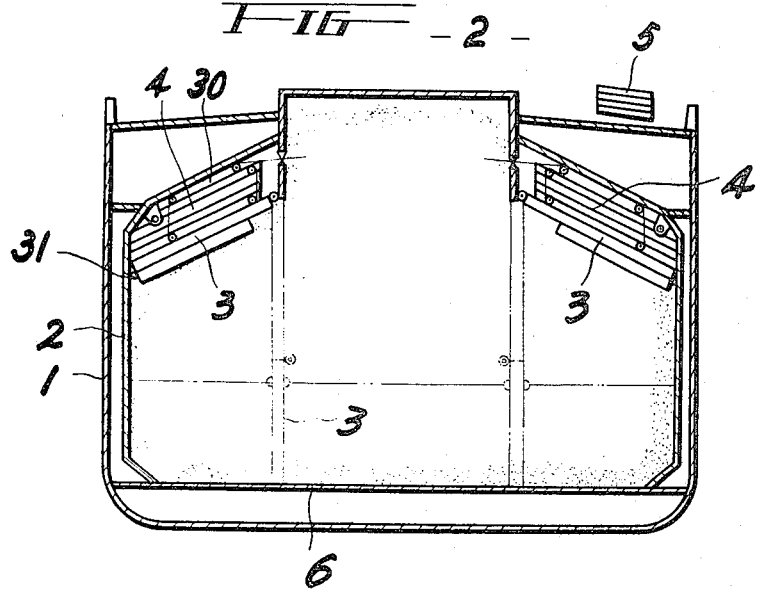
INVENTOR.
SHIGERU SUGANUMA
BY Steinberg & Blake
Attys

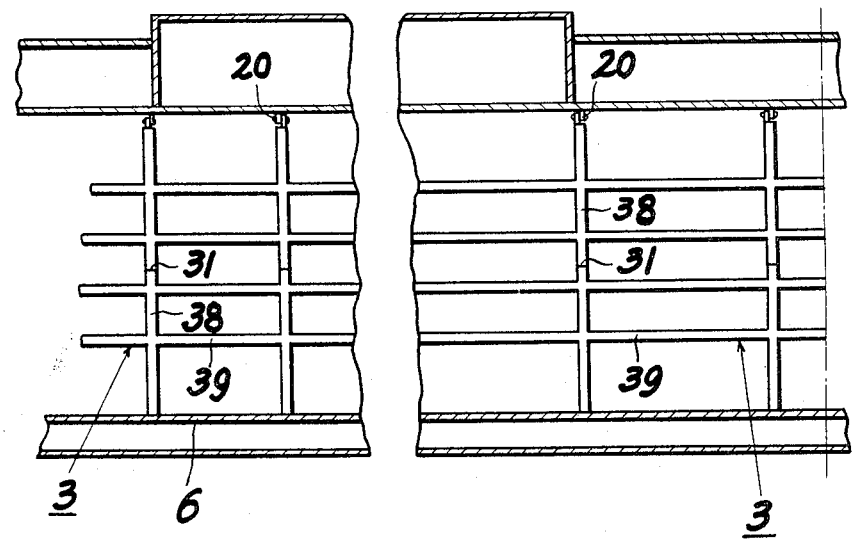
FIG_3_
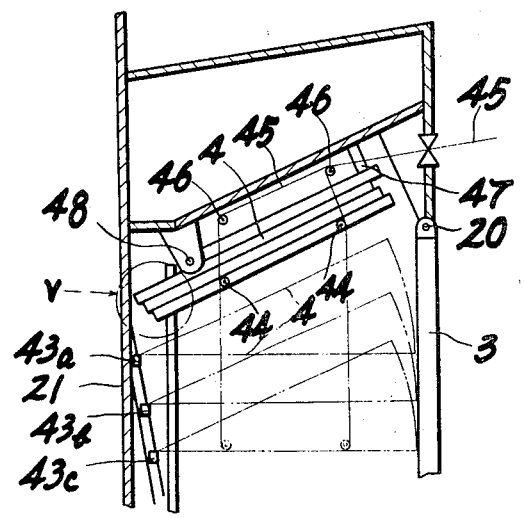
FIG_4_

June 11, 1968     SHIGERU SUGANUMA     3,387,581

CARGO SHIPS

Filed Sept. 7, 1966     4 Sheets-Sheet 4

INVENTOR.
SHIGERU SUGANUMA
BY Steinberg & Blake
Attys

United States Patent Office 3,387,581
Patented June 11, 1968

3,387,581
CARGO SHIPS
Shigeru Suganuma, Tokyo, Japan, assignor to Nippon Kokan Kabushiki Kaisha, Tokyo, Japan
Filed Sept. 7, 1966, Ser. No. 577,698
Claims priority, application Japan, Sept. 15, 1965, 40/56,075
11 Claims. (Cl. 114—72)

ABSTRACT OF THE DISCLOSURE

A cargo ship for carrying bulk and non-bulk cargo. A cargo-receiving space of the ship is defined by upper and lower walls as well as by a pair of side walls which extend longitudinally of the ship in the fore-and-aft direction, and a pair of upright frames are situated between and extend parallel to each other as well as to the side walls. These frames removably carry shelves which extend between the frames for supporting non-bulk cargo, and a pair of lateral groups of shelves are situated between the frames and the side walls. A structure is provided for raising the lateral groups of shelves to a stored position adjacent the upper wall of the cargo-receiving space, so that with these lateral groups of shelves in their stored positions and with the shelves which extend between the frames removed it is possible to situate bulk cargo in the cargo-receiving space. The upright frames themselves are capable of being raised to stored positions, so that in this way the cargo space can be adapted very conveniently either for bulk cargo or for non-bulk cargo.

---

The present invention relates to cargo ships.

One of the problems encountered in cargo ships is that they are designed to carry one type of cargo. For example, cargo ships which are designed to carry bulk cargo will in general be incapable of carrying non-bulk cargo. Bulk cargo can take the form of a flowable particulate material such as grain, ore, and the like, and this type of bulk cargo is simply poured into the storing compartments to be maintained therein until the ship reaches its destination whereupon the bulk cargo is unloaded. Generally the country to which such bulk cargo is shipped will not have bulk cargo to return, so that the cargo ship must return without any load, thus undesirably increasing the cost of operating the ship. On the other hand, if the cargo ship is designed to carry non-bulk cargo, such as automobiles, articles of machinery, packaged items, and the like, it is incapable of carrying bulk cargo, and when the non-bulk cargo is unloaded the ship must generally return in an unloaded condition although if it were capable of carrying bulk cargo it could in many cases receive such bulk cargo for the return voyage.

It is therefore of considerable advantage to provide cargo ships which are capable of accommodating both bulk and non-bulk cargo. While there have already been proposals to install on ships designed primarily for bulk cargo temporary supporting structures to carry non-bulk cargo, these temporary supporting structures have created serious problems in that they are difficult to set up and remove, requiring considerable time and labor for these operations, and resulting in transportation delays which only add undesirably to the costs of the operations.

It is, therefore, a primary object of the present invention to provide a cargo ship which is capable of carrying bulk and non-bulk cargo while at the same time eliminating the above drawbacks.

In particular, it is an object of the invention to provide for a cargo ship a structure which can be quickly and reliably operated to adapt the ship either to carry bulk cargo or non-bulk cargo.

A further object of the present invention is to provide a construction which in response only to the operation of winches which pay out or wind up cable can reliably place the cargo ship either in a condition for receiving bulk cargo or in a condition for receiving non-bulk cargo.

Thus, it is an object of the invention to provide a construction which enables a non-bulk cargo supporting structure to be removed from its cargo-supporting position in a simple, rapid manner providing a great increase in the efficiency of the transport operations as well as highly economical operations.

It is furthermore an object of the present invention to provide a non-bulk cargo supporting structure of the above type which is capable of supporting a heavy load with the components of the non-bulk cargo supporting structure stressed primarily in compression rather than in tension.

In particular, it is an object of the present invention to provide for a cargo ship a removable non-bulk cargo supporting structure which will transmit the load to the hull of the ship primarily through compression loads applied on the components of the non-bulk cargo supporting structure.

In addition, it is an object of the present invention to provide a non-bulk cargo supporting structure which can readily be stored in a relatively small space when bulk cargo is to be transported, thus leaving a relatively large volume of space available for bulk cargo.

Primarily the structure of the invention includes, in a cargo ship, a wall means defining a cargo-receiving space and including upper and lower walls as well as side walls extending between the upper and lower walls of the wall means. A plurality of upright frames are spaced from each other within the space defined by the wall means and are carried by and extend upwardly from the lower wall of the wall means, these upright frames each including a network of vertical and horizontal bars. A plurality of shelves are removably carried by the horizontal bars of the upright frames so that non-bulk cargo can be mounted on these shelves while when the shelves are removed, bulk cargo can be received in the space defined by the wall means.

The invention is illustrated by way of example in the accompanying drawings which form part of this application and in which:

FIG. 1 is a schematic transverse section of one possible embodiment of a cargo ship according to the present invention, the ship being shown in FIG. 1 in a position where it is adapted to carry non-bulk cargo;

FIG. 2 shows the structure of FIG. 1 in the position it takes in order to carry bulk cargo;

FIG. 3 is a fragmentary schematic longitudinal elevation of the structure of FIG. 1 taken along line III—III of FIG. 1 in the direction of the arrows;

FIG. 4 is a fragmentary sectional schematic elevation showing in a transverse view part of the structure at one side of the ship, FIG. 4 illustrating in particular how a lateral group of shelves is operated;

Figure 8:
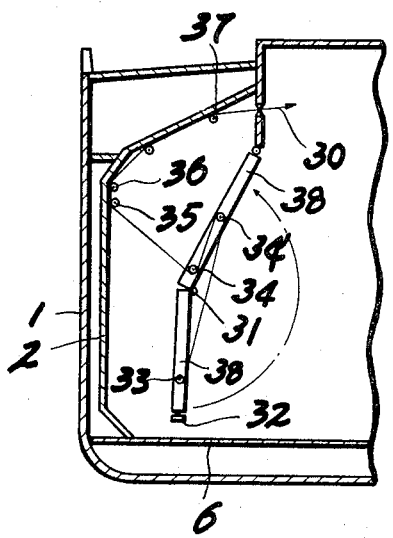
FIG. 8 shows the parts of FIG. 7 during their movement to their extended upright position in preparation for carrying a non-bulk cargo.
Figure 9:
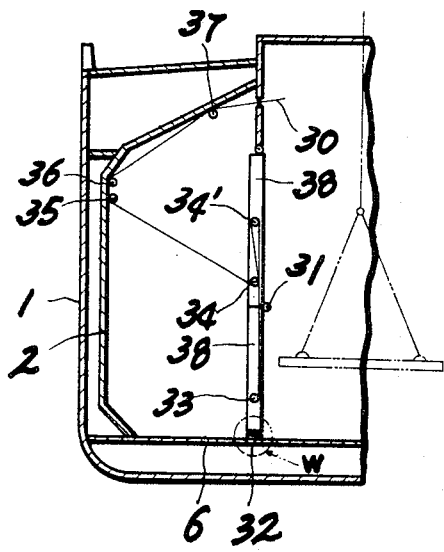
Figure 10:
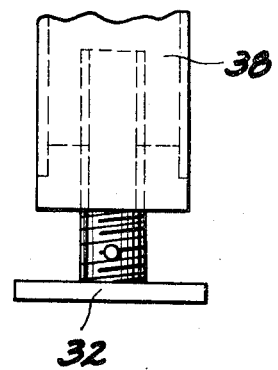

FIG. 9 shows the structure of FIG. 8 after it has reached its final position for participating in the carrying of non-bulk cargo; and FIG. 10 is a fragmentary elevation on an enlarged scale of an adjusting means of the invention capable of adjusting the upright frames so that they will be stressed primarliy in compression and so that they will reliably transmit the load to the hull of the ship, the structure of FIG. 10 being that part of the structure of FIG. 9 which is surrounded by the dot-dash line circle W of FIG. 9.

Referring to FIG. 1–3, the hull 1 of the ship illustrated therein includes an inner wall means 2 which defines an interior space which is adapted to receive cargo. This wall means 2 has upper and lower walls and side walls extending between the upper and lower walls longitudinally of the ship in the fore-and-aft direction, and the bottom all 6 of the wall means 2 is adapted to support the load both when the load is of the bulk type as well as when it is of the non-bulk type, as will be apparent from the description below.

In FIG. 1 the cargo-receiving space defined by the wall means 2 is shown as carrying a non-bulk cargo in the form of automobiles indicated in dot-dash lines. In FIG. 2 the space defined by the wall means 2 is shown as carrying a bulk type of cargo, and it will be noted that the structure which supports the non-bulk cargo of FIG. 1 has been displaced for the most part out of the space defined by the wall means 2.

In order to adapt the space within the wall means 2 for receiving non-bulk cargo, the structure of the invention includes a plurality of upright frames 3 which in the illustrated example are comprised of two upright frames 3 extending parallel to each other longitudinally of the ship and spaced inwardly of the side walls of the wall means 2 as well as spaced from each other, these parallel upright frames 3 extending parallel to the side walls of the wall means 2 so as to define between themselves an elongated intermediate compartment which receives the shelves 5 shown in FIG. 1. The pair of upright frames 3 together with the side walls of the hull which are parallel thereto form a pair of lateral compartments situated on opposite sides of the intermediate compartment and defined between the upright frames 3 and the side walls of the wall means 2, and a pair of groups of lateral shelves 4 are respectively situated in the lateral compartments, as indicated in FIG. 1.

As may be seen from FIG. 3, each frame 3 is made up of a network of vertical bars 38 and horizontal bars 39 extending therebetween. Each of the vertical bars 38 includes an upper section and a lower section, and the upper and lower sections of each bar 38 are hingedly connected to each other by a lower hinge means 31. The upper ends of the upper sections of the bars 38 are hingedly connected by an upper hinge means 20 to the upper wall of the inner wall means 2, so that in this way the frames 3 are hingedly connected with the upper wall of the wall means 2. Referring to FIGS. 9 and 10, it will be seen that the lower section of each vertical bar 38 carries an adjusting means 32 which is capable of adjusting the length of the bar 38 and which is in the form of a screw member threaded into the lower end of each lower section of the bar 38 and carrying at its bottom end a plate which engages the lower wall 6 of the wall means. When the vertical bars 38 have the extended position shown in FIG. 9, the adjusting means 32 is turned outwardly so as to press against the lower wall 6, and thus the weight of the frames 3 and the shelves carried thereby as well as the cargo mounted on the shelves will be directly supported by the wall 6 of the hull. As a result of the pressing of the upright frames 3 on the lower wall 6, the vertical bars 38 are stressed in compression rather than tension and the load is not required to be carried by the hinge means 20 and 31.

A raising-and-lowering means is operatively connected with the vertical or upright frames 3 for raising and lowering the same, and this raising-and-lowering means includes the cables 30 in the form of wire rope, for example, capable of being wound onto and unwound from unillustrated winches. The cables 30 have free ends fixed to the lower sections of the vertical bars 38, and for this purpose at least some of the vertical bars 38 have eyes fixed to their lower sections, and the free ends of the cable 30 are fixed to these eyes. Thus, FIGS. 8 and 9 show most clearly how each cable 30 is fixed at its bottom free end to an eye 33 which is fixed to the lower section of a vertical bar 38, the cable 30 extending upwardly from the eye 33 across the turning axis defined by the hinge means 31 and around an upper cable guide 34' carried by the upper section of the vertical bar 38, the cable then passing around a lower cable guide 34 also carried by the upper section of the vertical bar 38. These cable guides can take the form of suitable pulleys around which the cable is threaded in the manner indicated in FIGS. 8 and 9. From the lower cable guide 34 the cable 30 passes around a pair of additional cable guides 35 and 36 connected to a side wall of the wall means 2 and then along an upper cable guide 37 carried by the upper wall of the inner wall means 2, and from the cable guide 37 the cable 30 passes through a suitable opening to an unillustrated winch. There are a number of these cables respectively connected with a number of the bars 38 of the pair of frames 3, and these cables can be connected to winches which are operated in synchronism, for example. The cable guides 35–37 also take the form of suitable pulleys.

Figure 7:
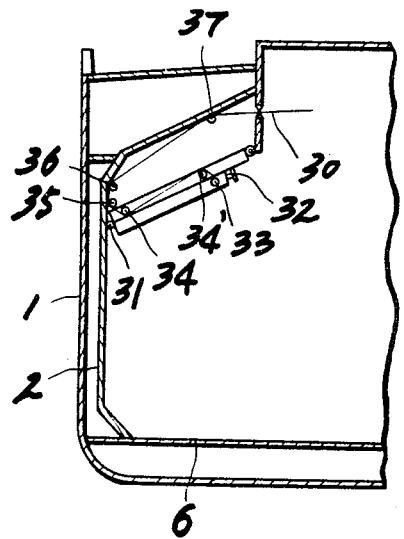
FIG. 7 is a fragmentary transverse section illustrating schematically at one side of the ship how an upright frame of the invention is situated in its stored position.

When the cables 30 are wound onto the winches they automatically pull the vertical frames 3 from their extended, shelf-supporting, upright positions indicated in FIGS. 1, 3, and 9, up to their stored positions indicated in FIGS. 2 and 7. During pulling of the cables the upper and lower sections of each vertical bar 38 will turn one with respect to the other at the hinge means 31 and in addition all of the upper sections of the vertical bars 38 will turn with respect to the wall means 2 at the upper hinge means 20. In this way the upright frames 3 can be displaced from their upright shelf-supporting positions to their stored positions located in upper portions of the lateral compartments beneath the stored lateral groups of shelves 4, as indicated in FIG. 2. In their stored positions each of the frames 3 has the lower sections thereof folded against the upper sections thereof, and they are inclined in the manner shown in FIGS. 2 and 7. The frames 3 can be maintained in their stored positions simply by the tension on the cables 30.

In order to return the upright frames 3 to their upright, shelf-supporting positions, the cables 30 of the raising-and-lowering means are unwound from their winches, and simply as a result of their own weight the upright frames will move from the position of FIG. 7 through the position of FIG. 8. into their fully extended positions shown in FIG. 9, so that with the structure of the present invention it is only necessary to operate winches, and in response to this operation the upright frames can be readily and quickly displaced between their shelf-supporting and stored positions. When the frames 3 are in their upright positions indicated in FIG. 9, the cables 30 can be slackened sufficiently to enable a portion thereof to be secured on the hinges 31 and suitable cable-securing members may be provided in the regions of the hinges 31 for this purpose, so that in this way the hinges 31 are protected and the cable 30 itself since it is in a slackened condition is protected. Of course, this relationship applies to each cable 30 and each vertical bar 38 to which a cable 30 is connected.

When the upright frames 3 are in their upright, shelf-supporting positions the intermediate group of shelves 5 can be placed on the horizontal bars 39 to be supported thereby, and in this way the intermediate compartment can receive the non-bulk cargo. Thus, the initial increment of the non-bulk cargo is placed directly on the lower wall 6, after which the lowermost shelves 5 are placed on the lowermost bars 39, and then the next increment of the non-bulk load for the intermediate compartment is placed on this lowermost group of shelves 5, after which the next higher shelves 5 are placed on the next higher bars 39, and so on, until the intermediate compartment defined between the upright frames 3 is filled with the non-bulk cargo, as indicated in FIG. 1. This filling of the intermediate compartment with the non-bulk cargo is the last phase of the operations for loading the space defined between the wall means 2 with non-bulk cargo. The lateral compartments are first loaded with the non-bulk cargo in a manner described below. During the unloading operations, the intermediate compartment is the first to be unloaded, and as the non-bulk cargo is removed the successively lowers shelves 5 are removed, and they may be stored and secured on the deck of the ship in the manner shown schematically at the upper right portion of FIG. 2.

Figure 5:
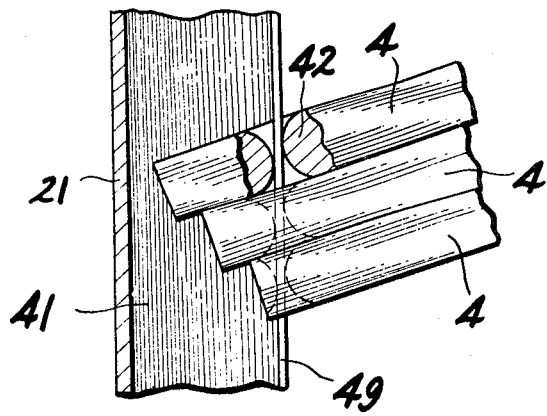
FIG. 5 is a fragmentary partly sectional elevation showing the details of how lateral shelves are guided, the structure of FIG. 5 being that part of the structure of FIG. 4 which is enclosed in the dot-dash line circle V of FIG. 4.
Figure 6:
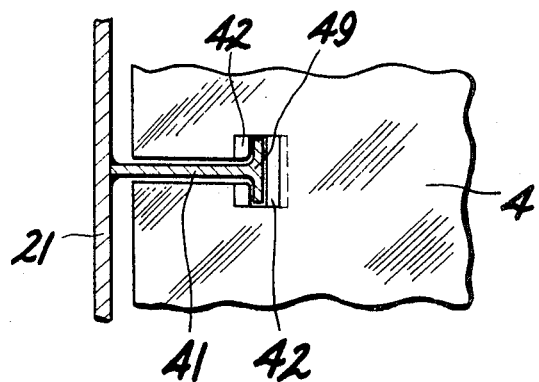
FIG. 6 is a fragmentary sectional plan view of the structure of FIG. 5.

Each of the lateral group of shelves 4 is comprised of a plurality of shelves each of which has an inner edge adapted to rest on one of the bars 39 and an outer edge to be carried by a support means which is fixed to the adjacent side wall of the wall means 2. Referring now to FIGS. 4–6, the support means fixed to the side wall 21 of the wall means 2 takes the form of a plurality of T-beams 41 having transverse webs welded to the side walls 21, these T-beams 41 extending vertically and being spaced from each other along the side walls 21. Each of the T-beams 41 has in addition to its transverse web which is directly fixed to the wall 21 a longitudinal web 49 which extends parallel to the wall 21 in the manner shown most clearly in FIG. 6.

Each of the groups of shelves 4 includes an uppermost shelf which is hinged at its outer edge to a suitable bracket 48 carried by the upper wall of the wall means 2, and the upper shelf of each group 4 can swing downwardly from the stored position thereof shown in FIG. 4 to the non-bulk cargo carrying position shown in FIG. 1 where the inner edge of each uppermost one of the shelves 4 rest on the uppermost bar 39 of an upright frame 3.

All of the shelves 4 except the uppermost shelves 4 are respectively formed with T-slots which receive the T-beams 41 of the support means in the manner shown in FIGS. 5 and 6. In this way the support means guides the shelves 4 for vertical movement between their stored positions shown in FIGS. 2, 4 and 5 and their cargo-supporting positions shown in FIG. 1. Each transverse web of each T-beam 41 carries a plurality of projections 43a, 43b, and 43c indicated in FIG. 4, and when the shelves 4 are lowered in a manner described below, the lowermost shelf of each group of shelves 4 will be received at its outer edge on the projections 43c. The next higher projection 43b is situated outwardly beyond the outer edge of the lowermost shelf 4 so that this lowermost shelf can move downwardly past the projections 43b onto the projections 43c. The shelf which is next to the lowermost shelf 4 will be received on the projection 43b, and the next higher projection 43a is situated outwardly beyond the outer edge of the shelf which is next to the lowermost shelf 4, so that each of the projections 43a–43c, except the lowermost projection is situated outwardly beyond the edge of the shelf which is supported on the next lower projection.

A raising-and-lowering means is also operatively connecting with the lateral groups of shelves 4 for raising and lowering them between their stored and cargo-carrying positions, and this raising-and-lowering means includes the cables 45, which can also take the form of wire ropes and which are wound on suitable, unillustrated winches which may be operated in synchronism to provide for raising and lowering of the lateral groups of shelves, The cables 45 are connected only to the lowermost shelf 4 of each of the lateral groups of shelves, and for this purpose the lowermost shelf of each lateral group carries eyes 44, for example. From these eyes 44 the cables 45 extend upwardly around suitable guide pulleys 46 carried by the upper wall of the wall means 2, and from the guide pulleys 46 the cables pass through suitable wall openings to the winches. Additional unillustrated guide pulleys are provided for the cables 45 as well as for the cables 30. Furthermore, the uppermost shelves of each lateral group 4 may carry suitable guide pulleys for some of the cables 45, as indicated in FIG. 1. As a result of this arrangement the several shelves of each lateral group 4 are carried by the lowermost shelf thereof. As this lowermost shelf is lowered from its stored position shown in FIG. 4, all of the shelves will move downwardly therewith, and the uppermost shelf will simply swing with respect to the hinge brackets 48 until the inner edges thereof rest on the uppermost horizontal bars 39. The remaining shelves will move downwardly with the lowermost shelf, and the uppermost one of these downwardly moving shelves will first engage the projections 43a. It will be noted from FIG. 4 that in the stored positions of the shelves 4 they are inclined upwardly and inwardly from the side walls of the wall means 2. They remain in this inclined position as they are lowered, so that the shelf which is directly beneath the uppermost shelf will first engage the projections 43a and then during the continued downward movement will swing around the projections 43a in a clockwise direction, as viewed in FIG. 4, until the inner edges of these shelves engage the horizontal bars 39 which are next to the uppermost horizontal bars 39. Then the next lower shelf will engage the projection 43b and will swing around the latter to engage bars 39 at the same elevation as the projections 43b, and finally the lowermost shelf of each group will reach the projections 43c and will swing around the latter to the horizontal position engaging the lowermost bars 39.

As is apparent from FIGS. 5 and 6, the depth of the T-slots for the several shelves are different with the lowermost shelf 4 having a T-slot of the shortest depth, while the next higher shelf has a deeper T-slot and so on, so that in this way the outer edges of the shelves will be displaced outwardly beyond each other to properly cooperate with the projections 43a–43c. In addition, the shelves 4 are provided at their T-slots with convexly curved surface portions 42 capable of rolling and sliding along the longitudinal webs 49 of the support means which includes the T-beams 41 and the projections 43a–43c. As a result of the convexly curved surfaces 42 it is possible for the shelves 4 to turn with respect to the T-beams while being slidably guided thereby in their inclined and horizontal positions.

In order to return the lateral groups of shelves 4 to their stored positions indicated in FIGS. 2 and 4, the winches which receives the cables 45 are actuated to wind up these cables, and they simply pull up on the lowermost shelves 4. These shelves move upwardly into engagement with the next higher shelves to raise the latter, and so on until all of the shelves have been raised to the stored positions indicated in FIG. 4. A suitable stop member 47 is fixed to and extends downwardly from the upper wall of the wall means 2 in order to engage each upper shelf of the group of shelves 4 and determine its inclination in the manner shown in FIG. 4, and these shelves 4 can be maintained in their stored position shown in FIG. 4 simply by the tension in the cable 45, or any suitable pins may be placed in suitable openings in the T-beams, for example, so as to releasably maintain the lateral groups of shelves in their stored positions.

In order to adapt the space within the wall means 2 to receive the bulk cargo of FIG. 2, therefore, after a non-bulk cargo as shown in FIG. 1 has been transported, the intermediate compartment will be unloaded and the shelves 5 will be placed on deck, as described above and shown in FIG. 2. Then the winches connected with the cables 45 are actuated so as to raise the lateral groups or shelves 4 to their stored positions in the manner described above. When the lateral groups of shelves 4 are in their stored positions the winches connected to the cables 30 are actuated to raise the upright frames 3 to their stored positions where they will be situated directly beneath the stored shelves 4 in the manner shown in FIG. 2. In this way very little of the space for receiving the bulk cargo is occupied by the frames 3 and the shelves 4, and the bulk cargo can be poured into and can substantially fill the space defined by the wall means 2, in the manner shown in FIG. 2. When the bulk cargo is unloaded and it is desired to again accommodate a nonbulk, the cables 30 are unwound and the upright frames 3 will automatically assume their upright, shelf-supporting positions in the manner described above. Thereafter the cables 45 are unwound from their winches and the shelves 4 will automatically assume their load-supporting positions. When the shelves 4 of the lateral groups have in this way reached their load-supporting positions, the lateral compartments are loaded with the non-bulk cargo, and then the intermediate compartment is loaded with the successive shelves 5 introduced into the intermediate compartment as the latter becomes loaded, in the manner described above.

It is thus apparent that with the structure of the invention the cargo-receiving space can easily be adapted in a quick, convenient, and efficient manner to receive either bulk or non-bulk-cargo, and the rapidity and ease with which the cargo space can be adapted to either type of cargo does not delay the transportation and provides an efficient, low-cost conversion of the cargo space to receive either type of cargo. Because the frames 3 do not hang from the upper wall of the wall means, but instead rest on the lower wall 6 thereof, the frame 3 is stressed only in compression and can reliably carry a very heavy load while relieving the load on the hinge means 20 and 31. Moreover, since the hull 1 of the ship has the double-wall construction shown in FIGS. 1–3, it is very strong and can reliably carry the heavy loads in a stable manner. In addition, the entire structure is maintained at a relatively light weight.

What is claimed is:

1. In a cargo ship, wall means defining a cargo-receiving space, said wall means including upper and lower walls and side walls extending between said upper and lower walls, a plurality of upright frames carried by and extending upwardly from said lower wall of said wall means, said upright frames being spaced from each other and each including a network of vertical and horizontal bars, and a plurality of cargo-supporting shelves removably carried by said horizontal bars for supporting non-bulk cargo in said space, said shelves when removed from said horizontal bars of said frames adapting said space to receive bulk cargo, said side walls of said wall means extending longitudinally of the ship in the fore-and-aft direction, said upright frames being substantially parallel to each other and to said side walls and being spaced inwardly of said side walls, and said plurality of upright frames being comprised of at least two upright frames respectively defining with said side walls a pair of lateral compartments extending longitudinally of the ship and defining between themselves an intermediate compartment situated between said lateral compartments and extending longitudinally of the ship, said shelves including three groups of shelves made up of a pair of lateral groups situated in said lateral compartments, respectively, and an intermediate group situated in said intermediate compartment, said intermediate group of shelves extending between and being carried exclusively by said upright frames and said lateral groups of shelves having inner edge portions supported by said frames, said lateral groups of shelves respectively having outer edge portions adjacent said side walls, and support means carried by said side walls for supporting said lateral groups of shelves at their outer edge portions, and a raising-and-lowering means operatively connected with said lateral groups of shelves for raising them away from said frames and support means upwardly toward said upper wall of said wall means to a stored position to adapt said lateral compartments to receive bulk cargo, said raising-and-lowering means lowering said lateral groups of shelves onto said support means and frames for adapting said lateral compartments to receive non-bulk cargo, said support means including a plurality of T-beams respectively having transverse webs fixed to said side walls and longitudinal webs spaced inwardly of and extending substantially parallel to said side walls, said lateral groups of shelves being formed at their outer edges with T-slots receiving said T-beams so that said lateral groups of shelves are guided by said T-beams during movement of said lateral groups of shelves between their stored and cargo-supporting positions.

2. The combination of claim 1 and wherein each of said lateral groups of shelves includes a lowermost shelf and a series of shelves located one above the other over said lowermost shelf, said support means including projections fixed to and extending from said transverse webs of said T-beams and comprised of lowermost projections situated beneath and supporting said lowermost shelves at their outer edges when said lowermost shelves are in their cargo-supporting positions, and said plurality of projections including a series of upper projections situated at elevations higher than said lowermost projections with each upper projection situated outwardly beyond the next lower projection and outwardly beyond the outer edge of a shelf which rests on the next lower projection, so that when said lateral groups of shelves are lowered from their stored to their cargo-supporting positions they will automatically engage and rest on said projections of said support means.

3. The combination of claim 2 and wherein said lateral groups of shelves when in their stored positions are inclined upwardly and inwardly from said side walls toward said intermediate compartment, so that said lateral groups of shelves when lowered to their cargo-supporting positions first engage said projections and then swing around the latter downwardly onto said horizontal bars of said upright frames.

4. The combination of claim 3 and wherein each of said lateral groups of shelves has at the T-slot of each of the latter shelves thereof convexly curved surface portions slidably engaging said webs of said T-beams which are parallel to said side walls and spaced inwardly thereof, so that said convexly curved surfaces of said lateral groups of shelves slidably engage said T-beams and turn with respect thereto during swinging of said lateral groups of shelves with respect to said T-beams.

5. The combination of claim 4 and wherein said raising-and-lowering means includes cables connected only to said lowermost shelves and each shelf of each of said lateral groups of shelves engaging and raising the next higher shelf during displacement of said lateral groups of shelves by said raising-and-lowering means from said cargo-supporting to said stored positions thereof.

6. In a cargo ship, wall means defining a cargo-receiving space, said wall means including upper and lower walls and side walls extending between said upper and lower walls, a plurality of upright frames carried by and extending upwardly from said lower wall of said wall means, said upright frames being spaced from each other and each including a network of vertical and horizontal bars, and a plurality of cargo-supporting shelves removably carried by said horizontal bars for supporting non-bulk cargo in said space, said shelves when removed from said horizontal bars of said frames adapting said space to receive bulk cargo, said side walls of said wall means extending longitudinally of the ship in the fore-and-aft direction, said upright frames being substantially parallel to each other and to said side walls and being spaced inwardly of said side walls, and said plurality of upright frames being comprised of at least two upright frames respectively defining with said side walls a pair of lateral compartments extending longitudinally of the ship and defining between themselves an intermediate compartment situated between said lateral compartments and extending longitudinally of the ship, said shelves including three groups of shelves made up of a pair of lateral groups situated in said lateral compartments, respectively, and an intermediate group situated in said intermediate compartment, said intermediate group of shelves extending between and being carried exclusively by said upright frames and said lateral groups of shelves having inner edge portions supported by said frames, said lateral groups of shelves respectively having outer edge portions adjacent said side walls, and support means carried by said side walls for supporting said lateral groups of shelves at their outer edges portions, and a raising-and-lowering means operatively connected with said lateral groups of shelves for raising them away from said frames and support means upwardly toward said upper wall of said wall means to a stored position to adapt said lateral compartments to receive bulk cargo, said raising-and-lowering means lowering said lateral groups of shelves onto said support means and frames for adapting said lateral compartments to receive non-bulk cargo, and a second raising-and-lowering means operatively connected with said upright frames for raising them away from upright, shelf-supporting positions carried by said lower wall upwardly toward said upper wall to stored positions where said frames are situated beneath said lateral groups of shelves when the latter are in their stored positions.

7. The combination of claim 6 and wherein said upright frames when in their upright, shelf-supporting positions have upper and lower ends, hinge means operatively connected to said upper ends of said frames and carried by said upper wall of said wall means for supporting said upright frames for swinging movement between their stored and upright positions, and adjustable means carried by said frames at their lower ends for adjusting the height thereof and for pressing against said lower wall of said wall means so that the weight of said frames as well as said shelves and non-bulk cargo carried thereby will be supported by said lower wall of said wall means while relieving the load on said hinge means.

8. The combination of claim 7 and wherein each of said vertical bars of each frame is comprised of a plurality of sections hingedly connected to each other, and said second raising and lowering means folding said sections against each other when displacing said frames to their stored positions, said sections swinging apart from each other and asssuming vertical positions in a common plane for each frame due to the weight of said sections as they are lowered by said second raising-and-lowering means to the upright, shelf-supporting positions of said frames.

9. In a cargo ship, wall means defining a cargo-receiving space, said wall means including upper and lower walls and side walls extending between said upper and lower walls, a plurality of upright frames carried by and etxending upwardly from said lower wall of said wall means, said upright frames being spaced from each other and each including a network of vertical and horizontal bars, and a plurality of cargo-supporting shelves removably carried by said horizontal bars for supporting non-bulk cargo in said space, said shelves when removed from said horizontal bars of said frames adapting said space to receive bulk cargo, said side walls of said wall means extending longitudinally of the ship in the fore-and-aft direction, said upright frames being substantially parallel to each other and to said side walls and being spaced inwardly of said side walls, and said plurality of upright frames being comprised of at least two upright frames respectively defining with said side walls a pair of lateral compartments extending logitudinally of the ship and defining between themselves an intermediate compartment situated between said lateral compartments and extending longitudinally of the ship, said shelves including three groups of shelves made up of a pair of lateral groups situated in said lateral compartments, respectively, and an intermediate group situated in said intermediate compartment, said intermediate group of shelves etxending between and being carried exclusively by said upright frames and said lateral groups of shelves having inner edge portions supported by said frames, said lateral groups of shelves respectively having outer edge portions adjacent said side walls, support means carried by said side walls for supporting said lateral groups of shelves at their outer edge portions, and a raising-and-lowering means operatively connected with said upright frames for raising them from upright, shelf-supporting positions upwardly away from said lower wall into upper stored positions situated at upper portions of said lateral compartments.

10. The combination of claim 9 and wherein each of said vertical bars of each frame is comprised at least of an upper section and a lower section situated beneath and forming an extension of said upper section when said frame is in its upright, shelf-supporting position, lower hinge means connecting each upper and lower section of each vertical bar to each other for turning movement one with respect to the other, upper hinge means operatively connected to upper ends of said upper sections of said vertical bars and to said upper wall of said wall means for connecting said upper sections of said vertical bars to said wall means for swinging movement with respect thereto, and a plurality of adjusting means operatively connected respectively with lower ends of said lower sections of said vertical bars for adjusting the lengths of said lower sections and for engaging and pressing against said lower wall of said wall means when said frames are in their upright positions to relieve the load on said upper hinge means and to transmit to the load of said frames, shelves, and non-bulk cargo carried thereby to said lower wall of said wall means, said raising-and-lowering means being connected with said vertical bars for raising said frames upwardly away from said lower wall to their stored positions while turning said upper sections around said upper hinge means into said lateral compartments and said lower sections around said lower hinge means to positions next to said upper sections.

11. The combination of claim 10 and wherein said raising-and-lowering means includes cables respectively having free ends connected at least to some of said vertical bars of said frames at the lower sections thereof, the upper section of each vertical bar to which a cable is connected having cable-guiding elements around which the cable is threaded at a portion extending from its end connected to the lower section, and said wall means carrying additional cable guides for the cable, the portion of the cable extending between the cable guides of the upper section and its end connected to the lower section of a vertical bar extending across the turning axis of said lower hinge means so that when the cables are pulled to raise said frames to their stored positions said lower sections will automatically turn at said lower hinge means with respect to said upper sections while the latter turn at said upper hinge means, and so that during lowering of said frames to their upright, shelf-supporting positions they will become automatically extended due to their own weight.

References Cited

UNITED STATES PATENTS 2,699,746    1/1955    Kendall et al.    114—72
2,736,287    2/1956    Kummerman    114—72

FOREIGN PATENTS 98,617    9/1961    Norway.

MILTON BUCHLER, *Primary Examiner.*

TRYGVE M. BLIX, *Examiner.*